US012636990B2

(12) United States Patent
Shahul Hameed et al.

(10) Patent No.: US 12,636,990 B2
(45) Date of Patent: May 26, 2026

(54) CONVERTIBLE CUP HOLDER IN AUTOMOTIVE CENTER CONSOLE TO STORE LARGE OBJECTS APART FROM CUPS

(71) Applicant: FCA US LLC, Auburn Hills, MI (US)

(72) Inventors: Rizan Asif Shahul Hameed, Tamil Nadu (IN); Raghuraman Taruvai Sankaran, Tamil Nadu (IN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/926,477

(22) Filed: Oct. 25, 2024

(65) Prior Publication Data

US 2026/0116282 A1    Apr. 30, 2026

(51) Int. Cl.
*B60N 3/10* (2006.01)

(52) U.S. Cl.
CPC .................................... *B60N 3/106* (2013.01)

(58) Field of Classification Search
CPC ...................................................... B60N 3/106
USPC ........................................................ 220/737
See application file for complete search history.

(56) References Cited

U.S. PATENT DOCUMENTS

| | | | | |
|---|---|---|---|---|
| 7,416,161 | B2 | 8/2008 | Shin | |
| 2003/0155476 | A1* | 8/2003 | Nakaya ................. | B60N 3/102 |
| | | | | 248/311.2 |

| | | | | |
|---|---|---|---|---|
| 2014/0159413 | A1* | 6/2014 | Sandhu ................. | B60N 3/106 |
| | | | | 220/737 |
| 2020/0269741 | A1* | 8/2020 | Koarai ................... | B60N 3/106 |

FOREIGN PATENT DOCUMENTS

| | | | | | |
|---|---|---|---|---|---|
| CN | 119590304 | A | * | 3/2025 | ............. B60N 3/106 |
| CN | 120207192 | A | * | 6/2025 | ............. B60N 3/106 |
| DE | 20021492 | U1 | * | 2/2002 | ............... B60N 3/10 |
| DE | 102015122084 | A1 | * | 6/2017 | ............. B60N 3/103 |
| DE | 102018001809 | A1 | * | 9/2019 | ............. B60N 3/106 |
| DE | 102023001197 | A1 | * | 10/2024 | ............. B60N 3/106 |
| KR | 100642550 | B1 | | 11/2006 | |
| WO | WO-2021065233 | A1 | * | 4/2021 | ............. B60N 3/106 |

* cited by examiner

*Primary Examiner* — Orlando E Aviles
*Assistant Examiner* — Niki M Eloshway
(74) *Attorney, Agent, or Firm* — Jeremy J. Klobucar

(57) ABSTRACT

A convertible cup holder includes a basin having a wall and a cavity. A first deployment mechanism includes a first carrier movable between a retracted position and a deployed position. A second deployment mechanism includes a second carrier movable between a retracted position and a deployed position. A first pad is coupled to the wall and includes a first central portion coupled to the first carrier. The first central portion also moves between a retracted position and a deployed position in concert with the first carrier. A second pad is coupled to the wall and includes a second central portion coupled to the second carrier. The second central portion like the first central portion, also moves between a retracted position and a deployed position in concert with the second carrier.

10 Claims, 6 Drawing Sheets

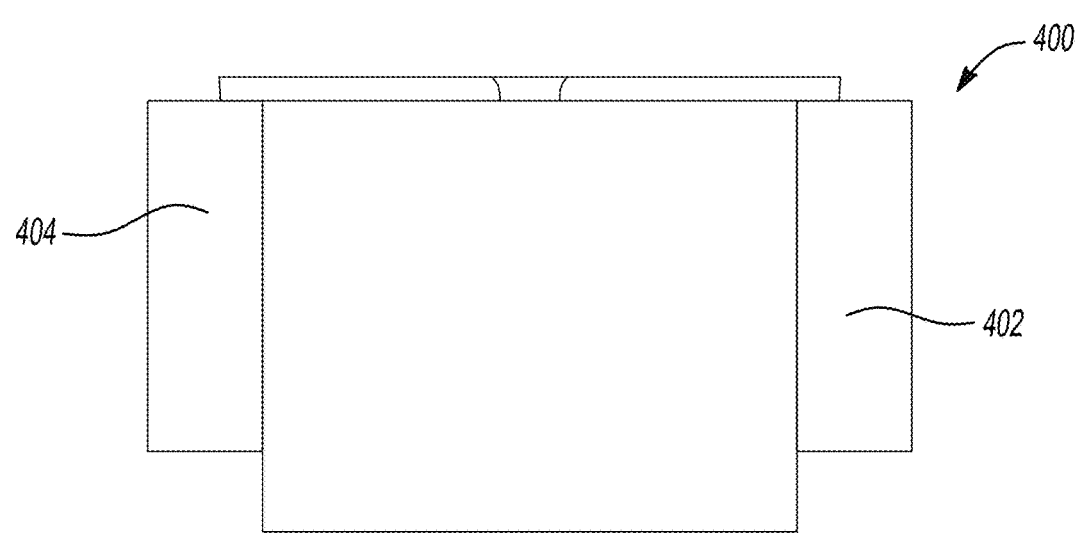
_Fig-11_
_Fig-12_
_Fig-13_

CONVERTIBLE CUP HOLDER IN AUTOMOTIVE CENTER CONSOLE TO STORE LARGE OBJECTS APART FROM CUPS

The present disclosure relates to a vehicle center console that may be converted from a cup holder to a tub shaped storage area to store large objects.

BACKGROUND

This section provides background information related to the present disclosure which is not necessarily prior art.

Cup holders and trays that are integrated into a center console of a vehicle have been implemented in the past. Some designs may have included removable or rotatable elements to subdivide the trays or cup holders to engage or otherwise guide cylindrical objects of different size. In one known arrangement, a device for holding cups and other objects includes two spaced apart sidewalls which divide a portion of the tray. One or more removable partitions may be positioned within the grooves on the sidewalls to subdivide storage space within the tray. The partition wall or walls may be moved to define one or more subdivided spaces.

In another arrangement, a rotatable arm may deploy or retract within a groove. The arm may be biased by a spring into contact with an outer surface a cylindrical object such as a cup placed in the cupholder.

While these prior devices may have functioned somewhat satisfactorily in the past, a need exists to accommodate larger or thicker objects such as wallets, compact handbags, phones and the like which do not adequately fit inside the cupholder. The need to adequately support a cup during vehicle operation continues to exist. As such, it may be beneficial to provide a convertible cupholder in an automotive center console operable to store large objects as well as cups.

SUMMARY

This section provides a general summary of the disclosure and is not a comprehensive disclosure of its full scope or all of its features.

A convertible cup holder includes a basin having a wall and a cavity. A first deployment mechanism includes a first carrier moveable between a retracted position and a deployed position. A second deployment mechanism includes a second carrier moveable between a retracted position and a deployed position. A first pad is coupled to the wall and includes a first central portion coupled to the first carrier. The first central portion also moves between a retracted position and a deployed position in concert with the first carrier. A second pad is coupled to the wall and includes a second central portion coupled to the second carrier.

In another arrangement a convertible cup holder includes a basin having a wall and a cavity. A first deployment mechanism includes a first carrier moveable between a retracted position and a deployed position. A second deployment mechanism includes a second carrier moveable between a retracted position and a deployed position. A first pad is coupled to the wall and includes a first portion, an opposite second portion, and a central portion therebetween. The first carrier is coupled to the first central portion and operable to move the first central portion between a retracted position and a deployed position. The first central portion moves inwardly within the cavity when moving from the retracted position to the deployed position. The first portion and the second portion remain at a predetermined position regardless of the position of the first central portion. A second pad is coupled to the wall and includes a first portion, an opposite second end portion, and a second central portion therebetween. The second carrier is coupled to the second central portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 11 is an end view of another alternate embodiment convertible cup holder;

FIG. 12 is a fragmentary cross-sectional view of a deployment mechanism including magnets in a retracted position; and FIG. 13 is a fragmentary cross-sectional view showing the deployment mechanism including magnets in a deployed position.

Corresponding reference numerals indicate corresponding parts throughout the several views of the drawings.

DETAILED DESCRIPTION

Figure 1:
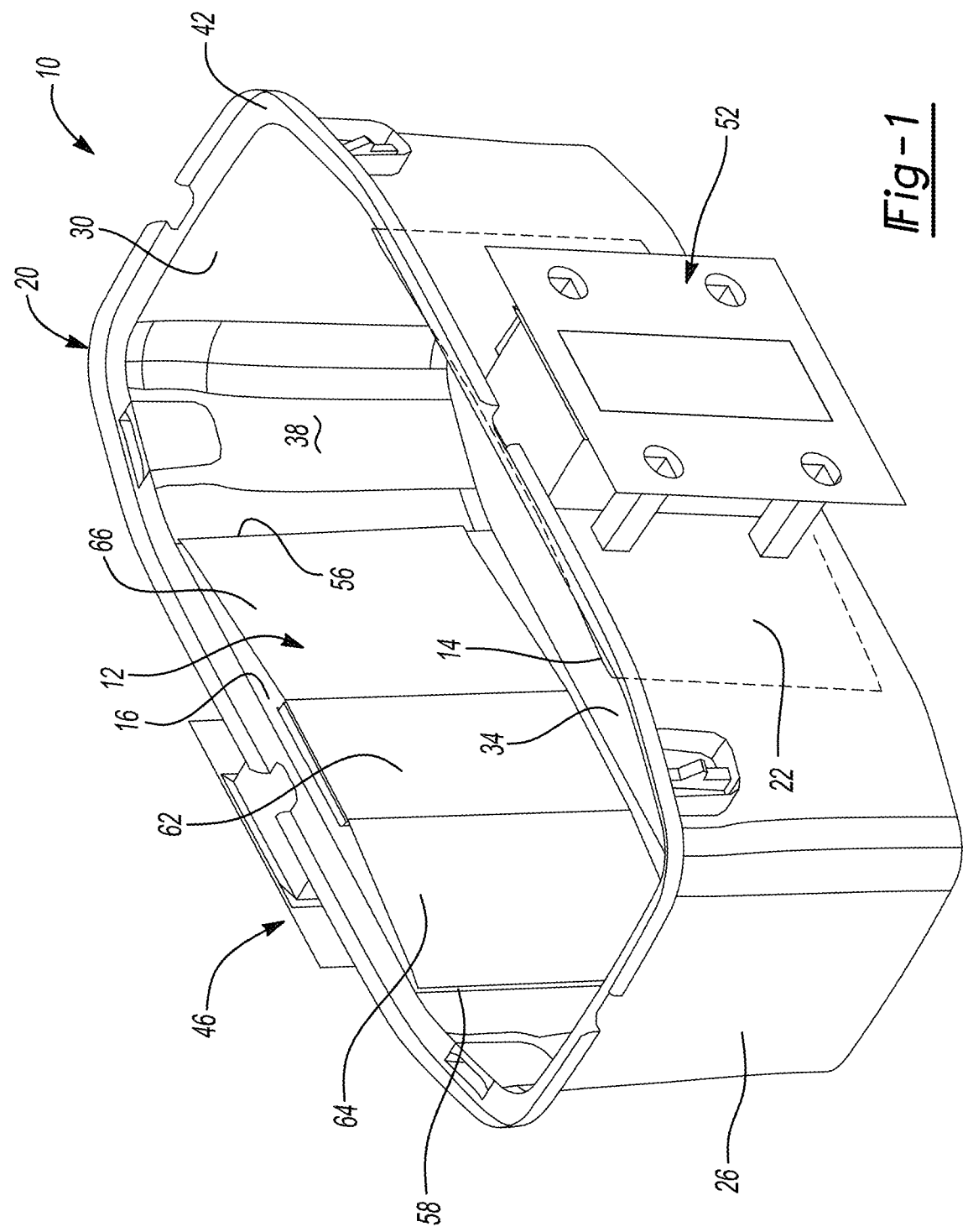
FIG. 1 is a perspective view of a convertible cup holder constructed in accordance with the teachings of the present disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Figure 2:
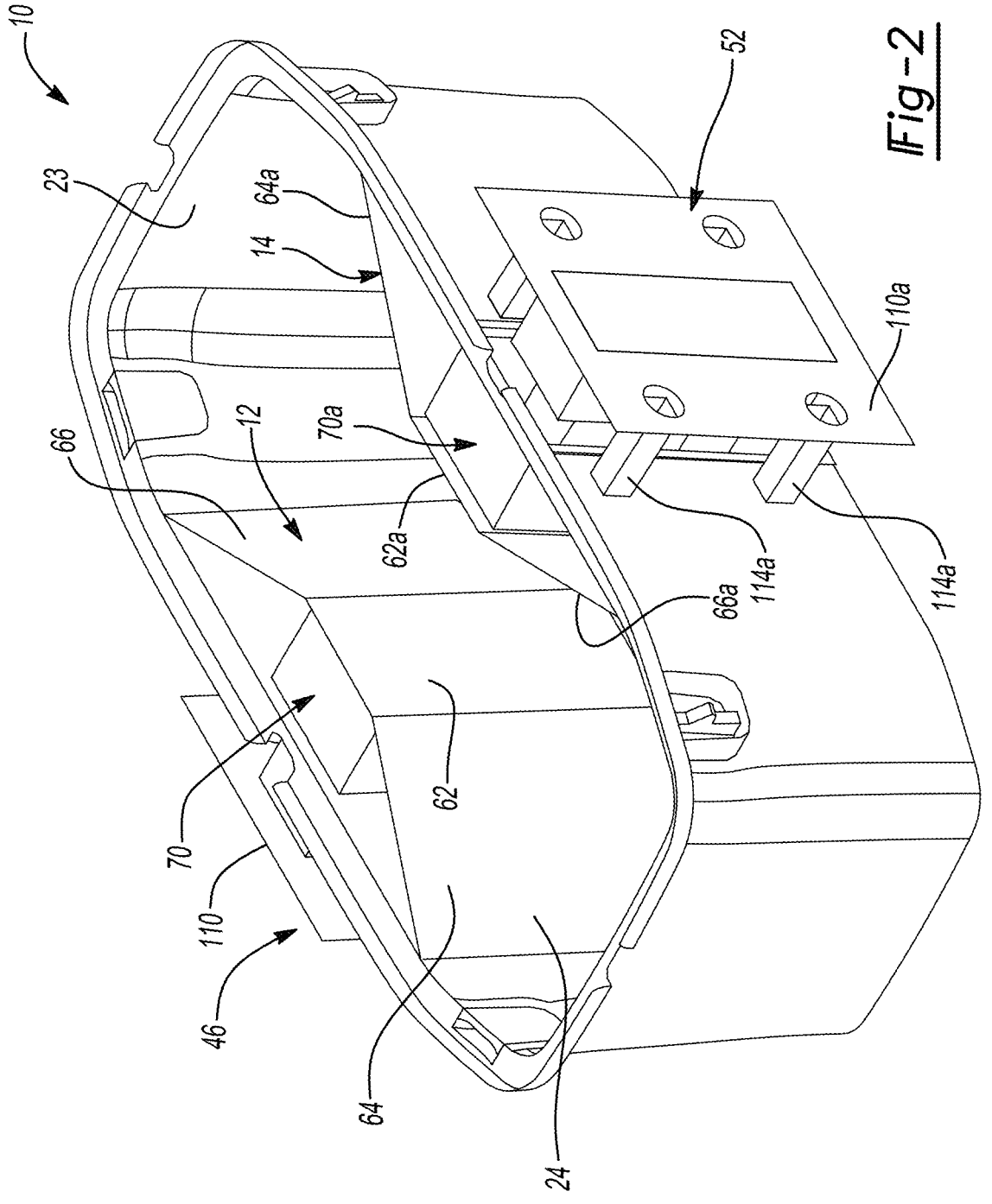
FIG. 2 is another perspective view of the convertible cup holder depicted in FIG. 1.

With reference to FIG. 1, a convertible cupholder 10 is shown including a first pad 12 and a second pad 14 located at retracted positions. By way of comparison, FIG. 2 depicts first pad 12 and second pad 14 at their respective deployed positions. In the retracted position, first pad 12 extends substantially parallel to a first wall 16 of a basin 20.

Similarly, when second pad 14 is at the retracted position, second pad 14 extends substantially parallel to a second wall 22 of basin 20.

As shown in FIG. 2, when first pad 12 and second pad 14 are in their deployed positions, second elastomeric panel portion 66 of first pad 12 and first elastomeric panel portion 64a of second pad 14 define a first receptacle 23 sized and shaped for receipt of a cylindrical or frusto-conically shaped member such as a cup. Similarly, first elastomeric panel portion 64 of first pad 12 and second elastomeric panel portion 66a of second pad 14 define a second receptacle 24 having a size and shape similar to first receptacle 23. When each of first pad 12 and second pad 14 are disposed at their deployed positions, center panel portion 62 and center panel portion 62a extends substantially parallel to one another and are positioned closer to one another than when first pad 12 and second pad 14 are at their retracted positions.

Basin 20 may be constructed as a one-piece, monolithic member having first wall 16, opposite second wall 22, as well as a third wall 26 and a fourth wall 30. Each wall is interconnected with a bottom 34 to define a cavity 38. Alternatively, basin 20 may be constructed as two or more interconnected components. Basin 20 may optionally include a radially outwardly extending flange 42 positioned at an open end of basin 20. Flange 42 may be useful for interconnecting convertible cup holder 10 with a vehicle's center console (not shown).

A first deployment mechanism 46 is coupled to first wall 16. First deployment mechanism 46 is operable to move first pad 12 from the retracted position shown in FIG. 1 to the deployed position as shown in FIG. 2. First deployment mechanism 46 is operable to maintain first pad 12 in either of the deployed or retracted positions. Similarly, a second deployment mechanism 52 is coupled to second wall 22 and operable to move and maintain second pad 14 at the retracted position or the deployed position. It should be appreciated that first pad 12, first wall 16 and first deployment mechanism 46 are substantially the same as, or substantially mirror images of, second pad 14, second wall 22 and second deployment mechanism 52. For clarity and brevity, only one side of convertible cup holder 10 will be described in detail. Similar components on the opposite side will be identified with an "a" suffix.

First pad 12 is shaped as a thin rectangular sheet having a first edge 56 fixed to first wall 16. An opposite second edge 58 of first pad 12 is also fixed to first wall 16. In one arrangement, first pad 12 includes a rigid center panel portion 62 coupled to a first elastomeric panel portion 64 and a second elastomeric panel portion 66. First elastomeric panel portion 64 and second elastomeric panel portion 66 may be formed from a stretchable fabric, an elastomer, or the like. When first deployment mechanism 46 radially inwardly moves center panel portion 62 further into cavity 38, first elastomeric panel portion 64 and second elastomeric panel portion 66 elongate to account for the length change in the panels because first edge 56 and second edge 58 remain at their initial positions fixed to first wall 16.

Alternatively, first pad 12 may be constructed as a multi segment panel having one or more living hinge mechanisms to allow first pad 12 to repeatedly move between the retracted position and the deployed position.

The present disclosure contemplates several alternate arrangements for providing first deployment mechanism 46 and second deployment mechanism 52. In one embodiment depicted in FIG. 3, first deployment mechanism 46 includes a carrier 70 and a toggle mechanism 74. Carrier 70 has a substantially parallelopiped shape with opposing first and second side walls 76, 78 as well as third and fourth opposing side walls 80, 82. An end wall 86 adjoins edges of first wall 76, second wall 78, third wall 80 and fourth wall 82. A flange 90 outwardly extends from each of first through fourth walls 76, 78, 80, 82. First side wall 16 includes an aperture 94 sized and shaped to allow carrier 70 to pass through the aperture and into cavity 38. Translation of carrier 70 is limited by flange 90. End wall 86 may be adhesively bonded or otherwise fixed to center panel portion 62 of first pad 12.

Figure 3:
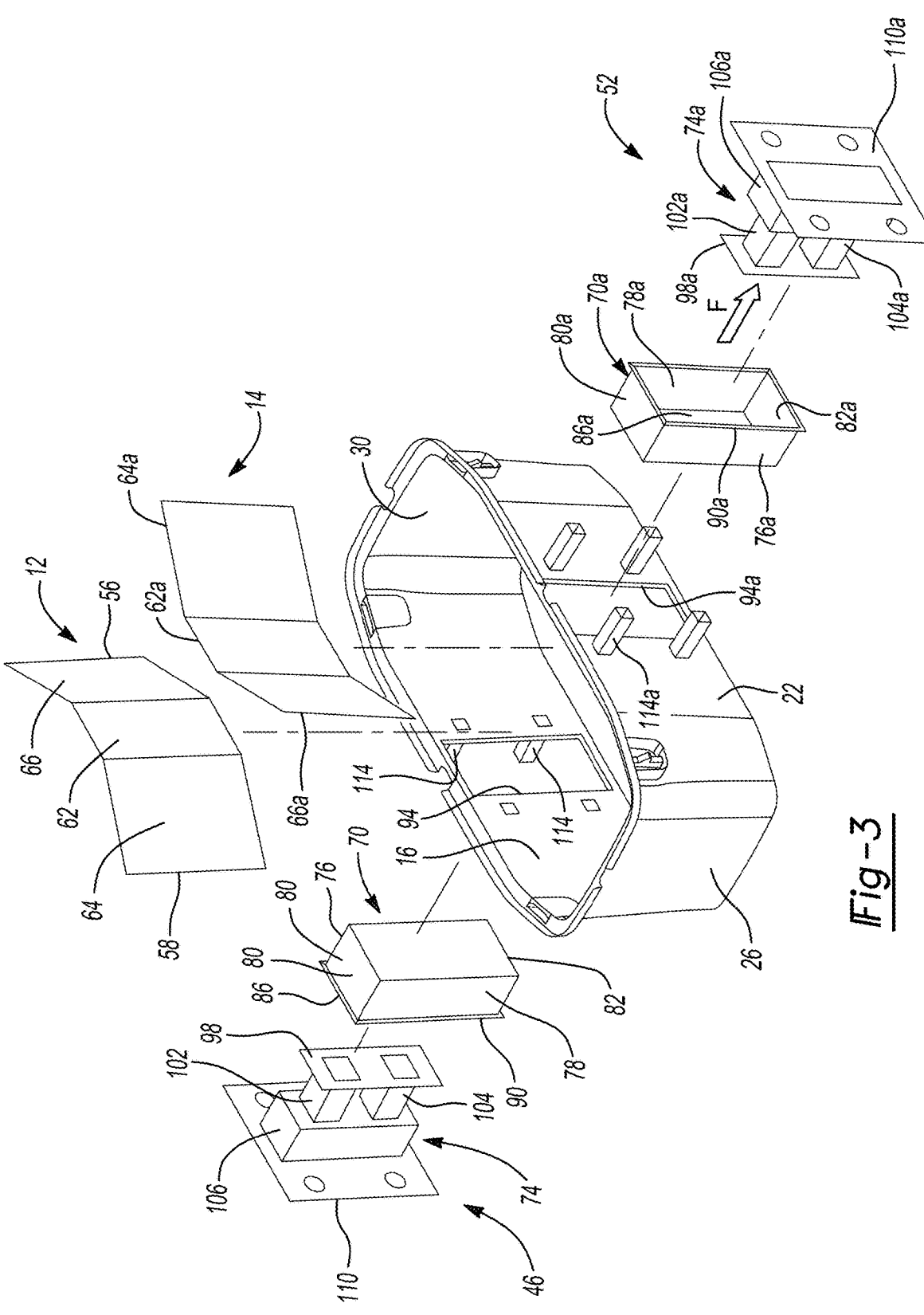
FIG. 3 is an exploded perspective view of the convertible cup holder depicted in FIG. 1.

Toggle mechanism 74 includes a plate 98 positioned in engagement with end wall 86 of carrier 70. Plate 98 is fixed to first and second telescopic rods 102,104 that extend and retract from a housing 106 of toggle mechanism 74. Springs (not shown) are positioned within housing 106 to urge first and second telescopic rods 102, 104 away from a base 110 of toggle mechanism 74. Plate 98, as well as first and second telescopic rods 102, 104, are selectively placed in a retracted or deployed position by applying a load in the direction of arrow F as shown in FIG. 3. Upon a first instance of an application of force along arrow F, plate 98 is urged toward base 110. If plate 98 was previously at the deployed position, an application of force in direction F will cause plate 98 to translate toward base 110 and be retained at the retracted position. If plate 98 was at the retracted position, an application of force to plate 98 along the direction of arrow F causes toggle mechanism 74 to release the springs within housing 106 to urge plate 98 toward the deployed position.

When plate 98 is in the retracted position, the walls of carrier 70 circumscribe plate 98, first and second telescoping rods 102, 104 and housing 106. At this time, first pad 12 is also at the retracted position. Base 110 is fixed to first wall 16 of basin 20. In one arrangement, a plurality of stanchions 114 outwardly extend from first wall 16. Base 110 is coupled to stanchions 114 using any number of manufacturing processes or mechanical fasteners including heat staking, rivets, or threaded fasteners. At the retracted position, carrier 70 is positioned within aperture 94 and partially protrudes into cavity 38. When in the deployed position carrier 70 inwardly extends into cavity 38. The translation is limited by the engagement of flange 90 with first wall 16.

To operate convertible cup holder 10 equipped with first deployment mechanism 46 and second deployment mechanism 52, a user simply positions their hand within cavity 38 and applies a force along a direction F, as shown in FIG. 3. First deployment mechanism 46 and second deployment mechanism 52 are individually operable. An application of force from the user to rigid center panel portion 62 transfers force to first deployment mechanism 46 and causes toggle mechanism 74 to switch from its present retracted or deployed position to the other retracted or deployed position. Toggle mechanism 74 maintains first pad 12 at the retracted position or the deployed position depending on the position at which the pad was initially positioned before the application of force. Second deployment mechanism 52 is operated in the same manner.

As depicted in FIGS. 4-7, an alternate embodiment convertible cup holder 200 is substantially similar to convertible cup holder 10. Convertible cup holder 200 primarily differs from convertible cup holder 10 in relation to the deployment mechanisms implemented to convert the shape of interior cavity from a pair of cup holders to an open tub-shaped cavity. Convertible cup holder 200 also differs in that a first pad 202 extends along a first wall 204 of a basin 206 approximately one half of its periphery. A second pad 208 is similarly shaped to first pad 202 and extends adjacent to a second wall 212. First pad 202 includes a flexible or elastomeric first portion 214, an elastomeric or otherwise flexible second portion 216, and a rigid central portion 218. Second pad 208 includes similar portions identified with like reference numerals, including an "a" suffix.

Figures 4, 5, 6, 7:
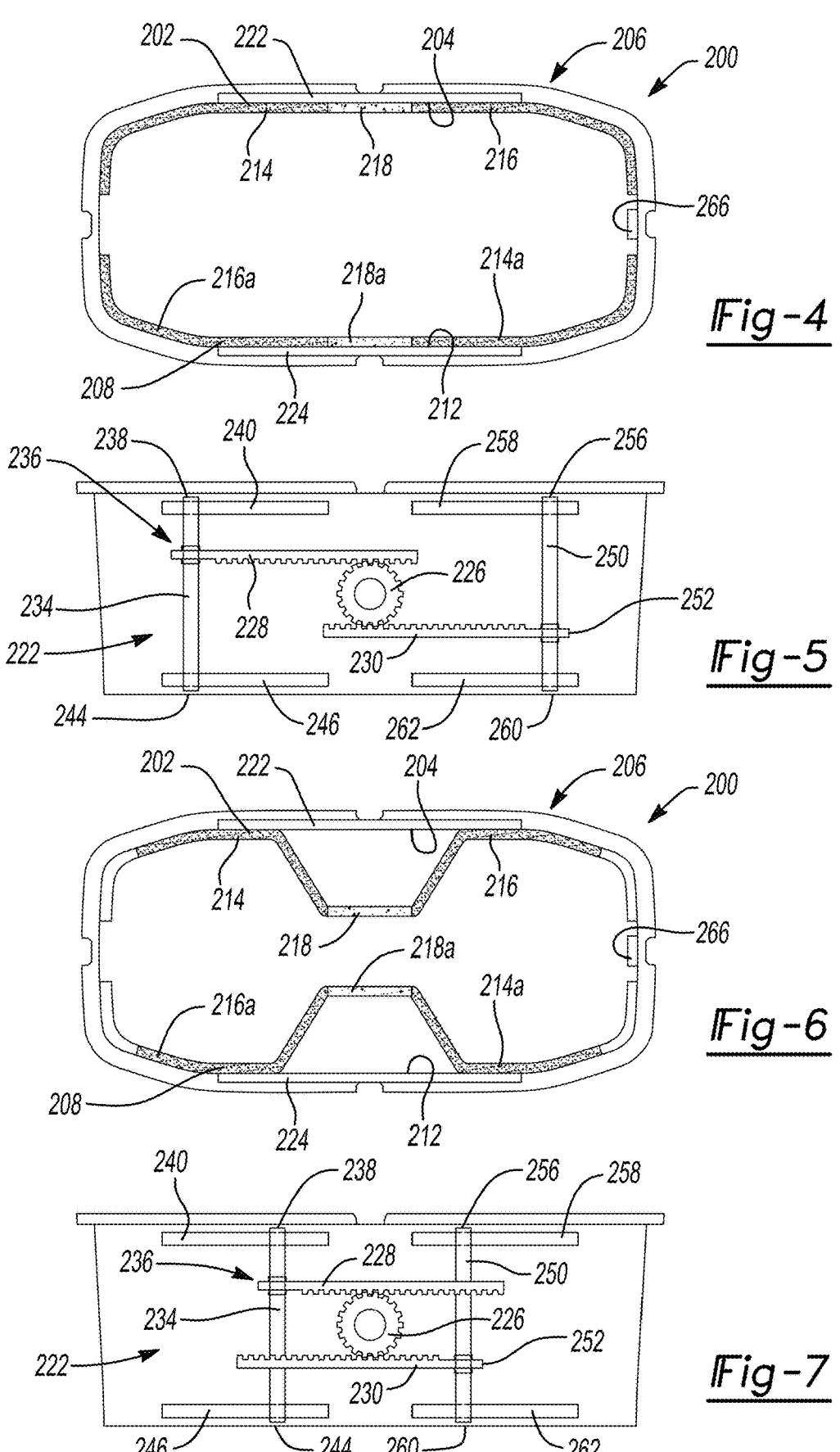
FIG. 4 is top view of an alternate embodiment convertible cup holder.
FIG. 5 is a side view of the convertible cup holder depicted in FIG. 4 having a deployment mechanism at a retracted position.
FIG. 6 is a top view of the convertible cup holder of FIG. 4 having first and second pads depicted at deployed positions.
FIG. 7 is a side view showing the deployment mechanism at a deployed position.

FIG. 5 depicts a first deployment mechanism 222. A second deployment mechanism 224 is positioned on the opposite side of convertible cup holder 200 in substantially the same fashion as first deployment mechanism 46 is positioned in relation to second deployment mechanism 52. First deployment mechanism 222 includes a rack and pinion device associated with slider mechanisms. In particular and with reference to FIG. 5, first deployment mechanism 222 includes pinion gear 226, a first rack 228, and a second rack 230. Rotation of pinion gear 226 causes first rack 228 to axially translate. Pinion gear 226 may be driven by an electric motor (not shown). Simultaneously, second rack 230 axially translates in the opposite direction as first rack 228. First deployment mechanism 222 further includes a first cross arm 234 fixed to a first end 236 of first rack 228. First cross arm 234 includes a first end 238 slidingly coupled for axial translation relative to a first guide rail 240. An opposite second end 244 of first cross arm 234 is slidingly coupled to a second guide rail 246. First guide rail 240 and second guide rail 246 are fixed to basin 206. First cross arm 234 is fixed to first portion 214 of first pad 202.

First deployment mechanism 222 also includes a second cross arm 250 fixed to an end 252 of second rack 230. Second cross arm 250 includes a first end 256 slidingly coupled for axial translation relative to a third guide rail 258. A second opposite end 260 of second cross arm 250 is slidingly coupled to a fourth guide rail 262. Third guide rail 258 and fourth guide rail 262 are fixed to basin 206. Second cross arm 250 is fixed to second portion 216 of first pad 202. FIG. 5 depicts the relative position of the components of first deployment mechanism 222 when first pad 202 is in its retracted position as depicted in FIG. 4.

FIG. 6 shows first pad 202 and second pad 208 in their deployed positions. FIG. 7 depicts the relative positions of the components of first deployment mechanism 222 when first pad 202 and second pad 208 are in their deployed positions. It should be appreciated that a clockwise rotation of pinion gear 226 as shown in FIG. 5 causes first pad 202 to move from the retracted position to the deployed position shown in FIG. 6. Second deployment mechanism 224 may be identical to or a mirror image of first deployment mechanism 222 and operates in substantially the same manner with relation to second pad 208.

Figures 8, 9, 10:
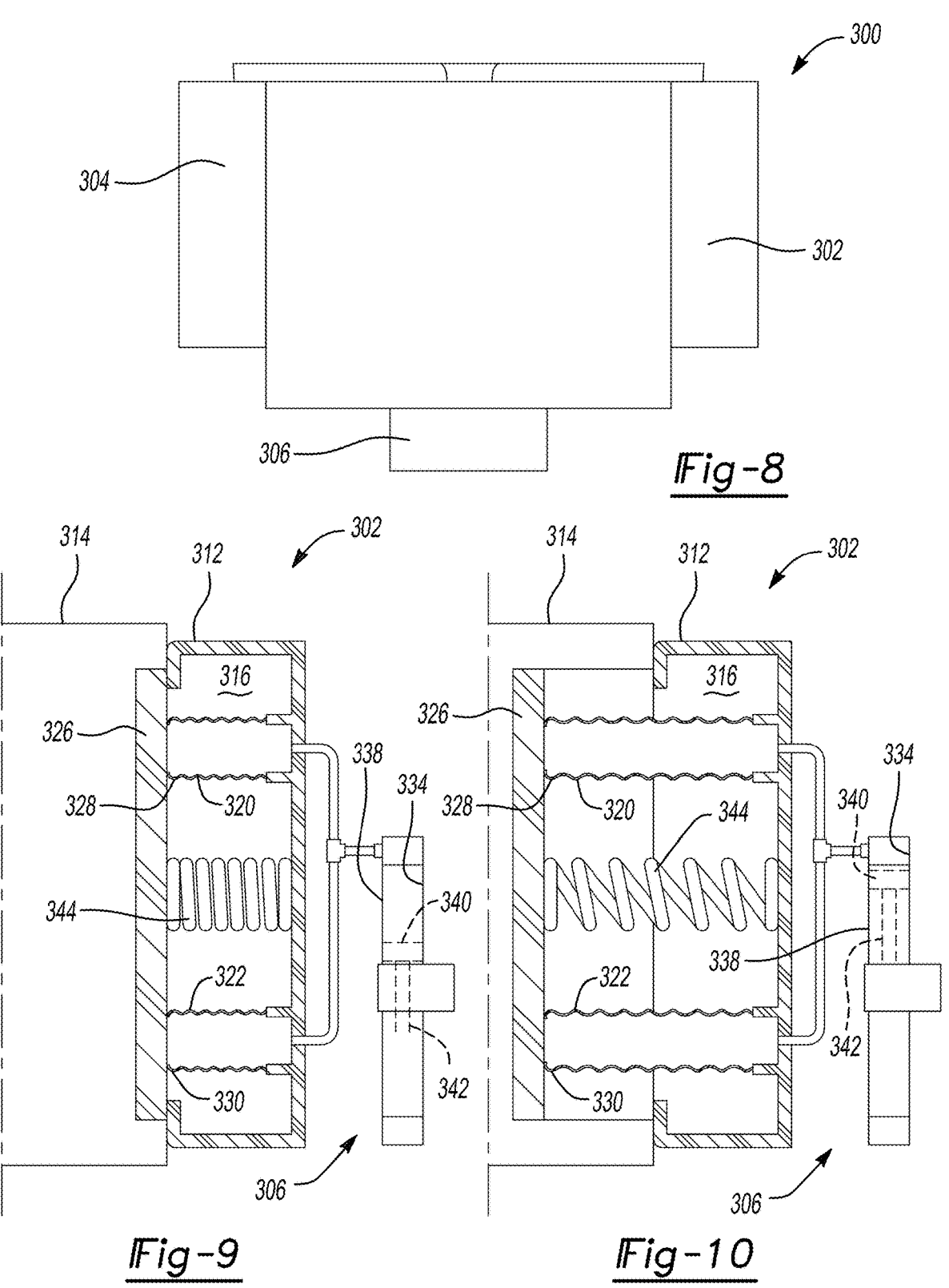
FIG. 8 is an end view of another alternate embodiment convertible cup holder.
FIG. 9 is a fragmentary cross-sectional view of a deployment mechanism showed in the retracted position.
FIG. 10 is a fragmentary cross-sectional view of the deployment mechanism in a deployed position.

With reference to FIGS. 8-10, another alternate embodiment convertible cup holder is identified at reference numeral 300. Convertible cup holder 300 is substantially similar to convertible cup holder 10 and convertible cup holder 200 with the exception of a first deployment mechanism 302, a second deployment mechanism 304 and an actuator 306. Actuator 306 may be a pneumatic or hydraulic actuator plumbed in fluid communication with each of first deployment mechanism 302 and second deployment mechanism 304. In similar fashion to the arrangements previously described, first deployment mechanism 302 is operable to move the first pad inwards and maintain either a deployed position or a retracted position of the first pad. Second deployment mechanism 304 is positioned on the opposite side of convertible cup holder 300 and functions similarly to the previously described first deployment mechanisms with regard to moving a second pad between retracted and deployed positions. FIG. 9 provides a fragmentary cross-sectional view of first deployment mechanism 302 and actuator 306 associated with the first pad being in the retracted position. FIG. 10 corresponds to the deployed position.

First deployment mechanism 302 includes a housing 312 coupled to a basin 314. Housing 312 includes a cavity 316 in receipt of a first bellows 320 and a second bellows 322. First deployment mechanism 302 includes a carrier 326 coupled to a first end 328 of first bellows 320 and a first end 330 of second bellows 322. Interior volumes of first bellows 320 and second bellows 322 are in fluid communication with a working chamber 334 of actuator 306. Actuator 306 may include a tube 338 in receipt of a piston 340 coupled to a piston rod 342. Axial translation of piston 340 and piston rod 342 changes the volume of working chamber 334. When carrier 326 is in the retracted position depicted in FIG. 9, the volume of working chamber 334 is at its maximum. Piston 340 and piston rod 342 maybe axially translated to reduce the volume of working chamber 334 and transfer working fluid such as air or oil into first bellows 320 and second bellows 322 thereby causing carrier 326 to inwardly translate toward the deployed position shown in FIG. 10. Retraction of piston 340 and piston rod 342 increases the volume of working chamber 334 and draws fluid from within first bellows 320 and second bellows 322 to retract carrier 326 toward the retracted position shown in FIG. 9. A tension spring 344 may interconnect carrier 326 and housing 312 to urge carrier 326 toward the retracted position.

FIGS. 11-13 depict another alternate embodiment convertible cup holder at reference numeral 400. Convertible cup 400 is substantially similar to convertible cup holder 300 with the exception of a first deployment mechanism 402 and a second deployment mechanism 404. FIG. 12 depicts first deployment mechanism 402 in a retracted position, while FIG. 13 depicts the first deployment mechanism 402 at a deployed position.

First deployment mechanism 402 includes a housing 406 defining a cavity 408. A first return spring 410 and a second return spring 412 are positioned within cavity 408. A carrier 414 is axially movable between the retracted position shown in FIG. 12 and the deployed position shown in FIG. 13. Carrier 414 is coupled to first return spring 410 with a first rod 416. Similarly, carrier 414 is coupled to second return spring 412 with a second rod 418. First return spring 410 and second return spring 412 urge carrier 414 toward the retracted position depicted in FIG. 12.

First deployment mechanism 402 includes a drive shaft 422 coupled to carrier 414 at one end. A first permanent magnet 424 is positioned at an opposite end of drive shaft 422. First permanent magnet 424 is fixed to drive shaft 422 and carrier 414 such that relative rotation between first permanent magnet 424 and carrier 414 does not occur. Carrier 414, drive shaft 422, and first permanent magnet 424 are axially translatable as one piece. A second permanent magnet 426 is positioned adjacent to first permanent magnet 424 and is rotatable relative thereto. When the poles of the magnets are positioned in a first orientation as depicted in FIG. 12, an attractive force exists between first permanent magnet 424 and second permanent magnet 426. Accordingly, carrier 414 is drawn towards the retracted position and remains there. When second permanent magnet 426 is rotated such that first permanent magnet 424 repels second permanent magnet 426, the magnets 424,426 space apart from one another and axially translate carrier 414 to the deployed position as depicted in FIG. 13. Second deployment mechanism 404 is configured in substantially the same manner as first deployment mechanism 402.

A user may control operation of any one of convertible cup holders 200, 300, or 400 using an electric switch or switches, an electronically controlled touch screen, or a capacitive sensor operable to detect the presence of the user's hand. It is contemplated that the electric switches may be positioned at any convenient location on the instrument panel, the vehicle door panels, or the center console. The electronically controlled touch screen may be part of an instrument panel, infotainment system, or the like. The capacitive sensor may be mounted to the basin and may or may not include a cover that is disposable between open and closed positions. In one example, FIG. 4 depicts an exemplary capacitive sensor 266 mounted on basin 206.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A convertible cup holder, comprising:
   a basin including a wall and a cavity;
   a first deployment mechanism including a first carrier movable between a retracted position and a deployed position;
   a second deployment mechanism including a second carrier movable between a retracted position and a deployed position;
   a first pad coupled to the wall and including a first central portion, the first carrier being coupled to the first central portion and operable to move the first central portion between a first position proximate the wall and a second position within the cavity and further from the wall than when at the first position; and
   a second pad coupled to the wall and including a second central portion, the second carrier being coupled to the second central portion and operable to move the second pad between a third position proximate the wall and a fourth position within the cavity and further from the wall than when at the third position,
   wherein the first deployment mechanism includes a manually operable toggle switch operable to maintain the position of the first carrier at one of the retracted and deployed positions.

2. The convertible cup holder according to claim 1, wherein the first pad includes a first end and an opposite second end, each of the first and second ends being fixed to the wall.

3. The convertible cup holder according to claim 1, wherein the first pad includes an elastomeric portion that elongates when the first pad is moved from the retracted position to the deployed position.

4. The convertible cup holder according to claim 1, wherein the first pad and the second pad are diametrically opposed to one another.

5. The convertible cup holder according to claim 1, wherein the second deployment mechanism is separately operable relative to the first deployment mechanism.

6. The convertible cup holder according to claim 1, wherein the first carrier is coupled to the first central portion of the first pad such that the first central portion is disposed at the first position when the carrier is disposed at the retracted position.

7. A convertible cup holder, comprising:

a basin including a wall and a cavity;

a first deployment mechanism including a first carrier movable between a retracted position and a deployed position;

a second deployment mechanism including a second carrier movable between a retracted position and a deployed position;

a first pad coupled to the wall and including a first central portion, the first carrier being coupled to the first central portion and operable to move the first central portion between a first position proximate the wall and a second position within the cavity and further from the wall than when at the first position; and a second pad coupled to the wall and including a second central portion, the second carrier being coupled to the second central portion and operable to move the second pad between a third position proximate the wall and a fourth position within the cavity and further from the wall than when at the third position, wherein the first deployment mechanism includes a rack and pinion mechanism.

8. The convertible cup holder according to claim 7, wherein the rack and pinion mechanism includes a rack coupled to the first pad, wherein rotation of a pinion gear translates the rack and urges the first pad toward one of the first and second positions.

9. The convertible cup holder according to claim 8, wherein the rack and pinion mechanism includes another rack drivingly engaged with the pinion gear, the another rack moving in a opposite direction as the rack moves when the pinion is rotated in a first direction, wherein the another rack is also coupled to the first pad.

10. A convertible cup holder, comprising:

a basin including a wall and a cavity;

a first deployment mechanism including a first carrier movable between a retracted position and a deployed position;

a second deployment mechanism including a second carrier movable between a retracted position and a deployed position;

a first pad coupled to the wall, the first pad including a first portion, an opposite second portion and a first central portion therebetween, the first carrier being coupled to the first central portion and operable to move the first central portion between a first position and a second position, the first central portion moving inwardly within the cavity when moving from the first position to the second position, wherein the first portion and the second portion of the first pad remain at a predetermined position regardless of the position of the first central portion; and a second pad coupled to the wall, the second pad including a first portion, an opposite second portion and a second central portion therebetween, the second carrier being coupled to the second central portion, wherein the first deployment mechanism includes a bellows coupled to the first carrier, the bellows being in fluid communication with a source of fluid, wherein the bellows is movable between retracted and deployed positions based on a supply or a withdrawal of fluid within the bellows.

* * * * *